C. F. PERKINS.
CHISEL.
APPLICATION FILED JULY 3, 1915.
1,174,894.
Patented Mar. 7, 1916.
3 SHEETS—SHEET 1.
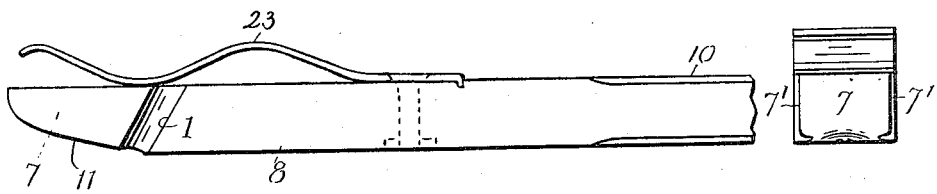
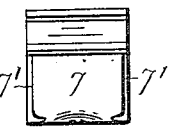
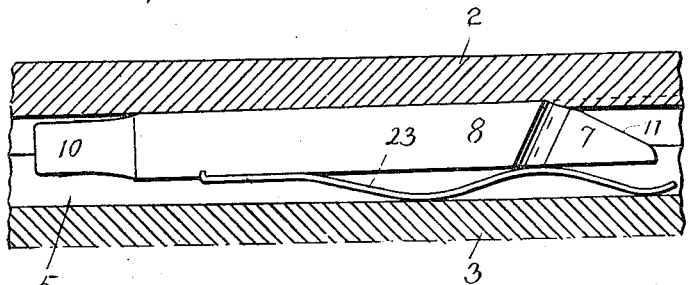
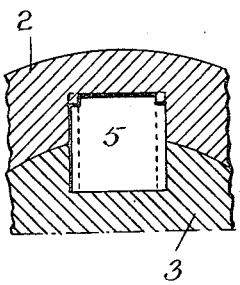
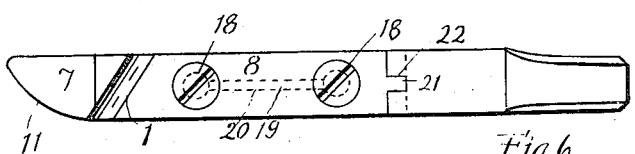
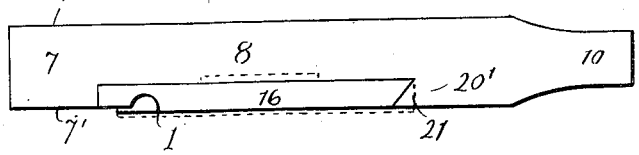
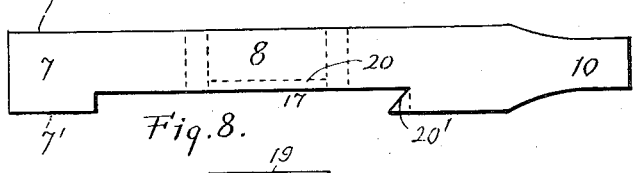
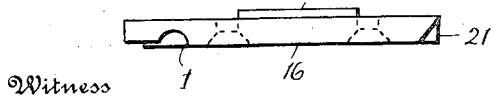
Witness
Stuart Hilder.
Inventor
Charles F. Perkins
By E. W. Anderson & Son
his Attorneys

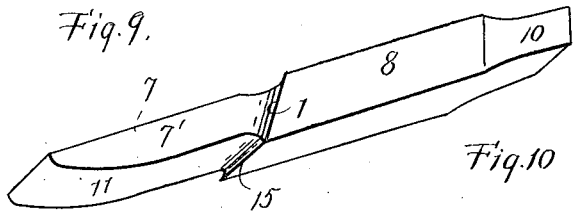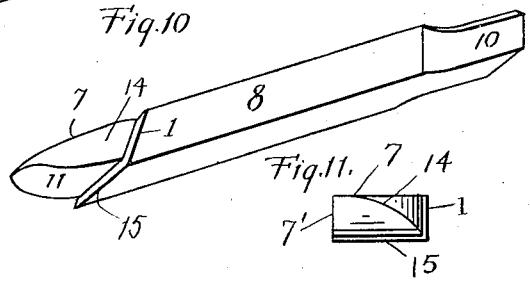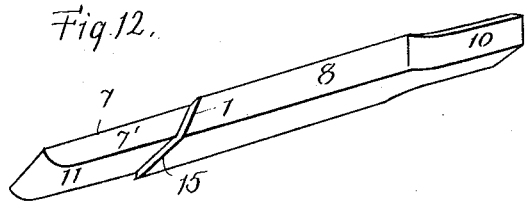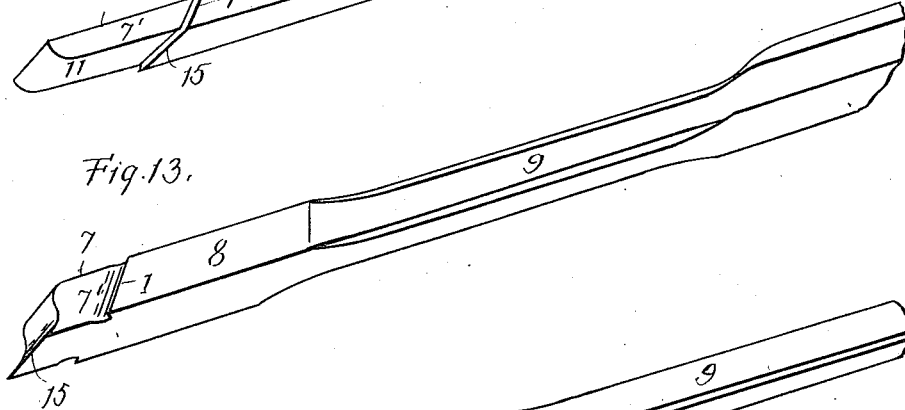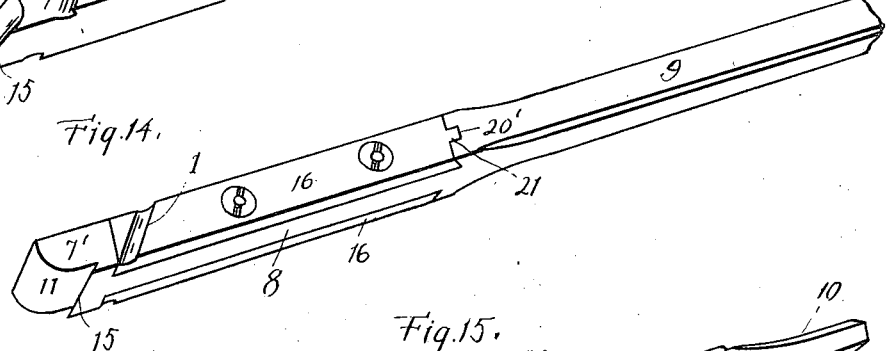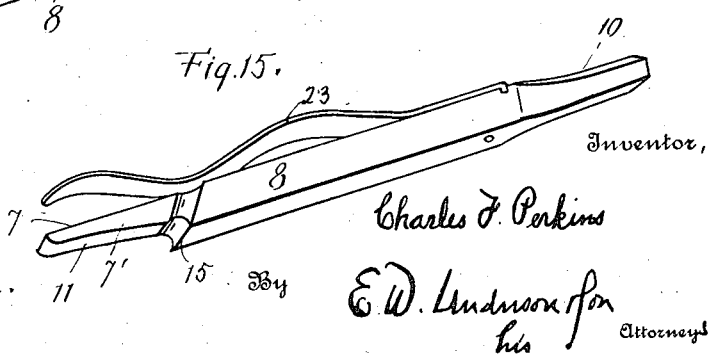

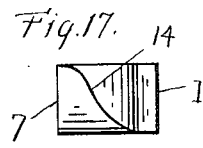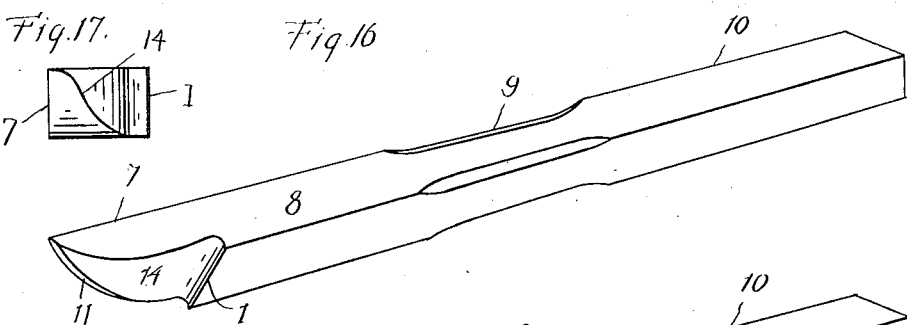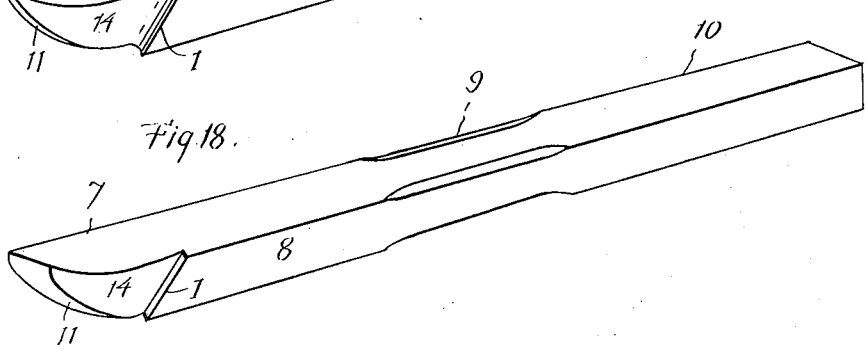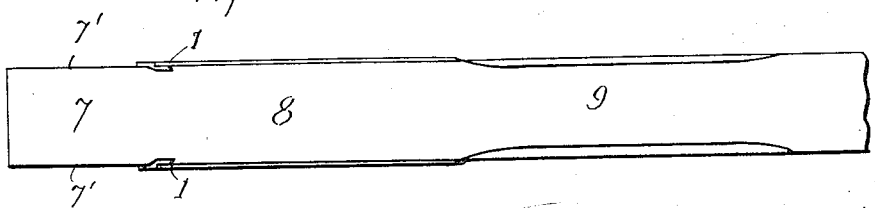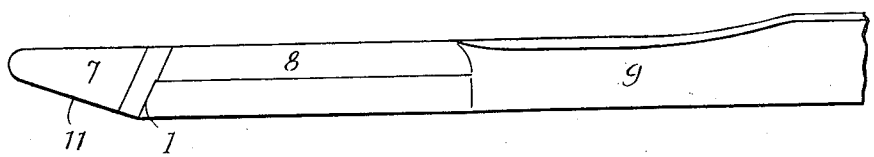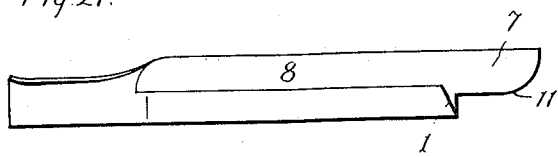

UNITED STATES PATENT OFFICE.

CHARLES F. PERKINS, OF SOUTH BREWER, MAINE, ASSIGNOR TO HIMSELF AND GEORGE A. DE RUSHA, OF SOUTH BREWER, MAINE.

CHISEL.

1,174,894.

Specification of Letters Patent.

Patented Mar. 7, 1916.

Application filed July 3, 1915. Serial No. 37,936.

*To all whom it may concern:*

Be it known that I, CHARLES F. PERKINS, a citizen of the United States, resident of South Brewer, in the county of Penobscot and State of Maine, have made a certain new and useful Invention in Chisels; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a side view of the invention, having the pressure spring attached thereto. Fig. 2 is an end view of the same. Fig. 3 is a side view of the same in reversed position and in engagement with the keyway of the work, to cut out the corners left in this keyway and to widen the keyway. Fig. 4 is a cross-section of the keyway in the work, showing the metal left in the corners. Fig. 5 is a side view of the invention, provided with a removable cutter, showing the wide clearance for cutting tough metal. Fig. 6 is a plan view of the same. Fig. 7 is a similar view, with cutter removed. Fig. 8 is a detail plan view of the cutter. Fig. 9 is a perspective view of the tool, having a bottom cutter. Fig. 10 is a similar view of a modification of the invention, wherein the forward guide extension has a laterally beveled wall, in addition to the beveled forward wall. Fig. 11 is an end view of the same. Fig. 12 is a perspective view of a modification of the invention, wherein the forward end of the guide extension is blunt. Fig. 13 is a perspective view of a modification of the invention, wherein the bottom cutter is at the forward end of the beveled forward wall, and showing the reduced portion of the shank in rear of the guide portion and between the guide portion and the strike portion, and showing also a cutter at each side. Fig. 14 is a similar view of a modification, having removable cutters, one at each side. Fig. 15 is a similar view of a modification, having a proportionately longer forward guide extension, lateral and bottom cutters the channels in front of which are wide, for better clearance of the chips in working in tough metal, and the pressure spring being shown as attached. Fig. 16 is a perspective view of a modification, wherein the forward extension has a lateral beveled wall, as well as a forward beveled wall, the channel in front of the cutter being wide, for better clearance of the chips, and the reduced shank portion being shown. Fig. 17 is an end view of the same. Fig. 18 is a perspective view of a similar tool, having a narrow channel in front of the cutter, for working in softer metal. Fig. 19 is a side view of a tool having a side cutter of less height than the thickness of the tool. Fig. 20 is a plan view of the same. Fig. 21 is a side view of a right-hand tool, wherein a blunt forward end is shown and the cutter is of the same character as in Fig. 19.

The object of the invention is to provide an improvement in devices for widening key-seat channels of hubs or couplings, without removal thereof from the shaft, and it consists in the novel construction and combinations of parts, as hereinafter set forth.

In the accompanying drawings the numeral 2 indicates a metallic hub or coupling, having a base 3, which is provided with a key-seat channel 5. In widening this channel it is designed to take the metal from each wall, in order to insure proper engagement with the spline or key, and, therefore, the tools or chisels which I have devised are preferably made in right-hand and left-hand styles, or with cutters upon both sides.

The instrument or chisel, which is made of tool steel, consists of a guiding end and bit portion 7, a parallel wall guide portion 8, a reduced or clearing portion 9 and a handle and strike portion 10, all of these parts being integral. Instead of a hand strike, the tool may be provided with a tang for a power connection.

The front end or bit portion of the tool consists of the forward guiding end or extension 7 of the guide portion 8, said extension being narrower than the portion 8 and having usually parallel side walls 7', 7', designed to fit the old key-seat, and is provided with an oblique cutting edge 1, which is in the plane and terminates one side wall of the guide portion 8. The channel of the cutting edge may be angular, or rounded out in concave form, the latter shape being preferable for a tool to be used in cutting steel or tough metal, as it will provide a better clearance for freeing the shaving. The bottom or forward wall 11 of the guide extension 7 is usually beveled from the end of the extension backward to the lower end of the oblique channel, terminating opposite the end of the cutting edge. In rear of the parallel wall portion 8 the shank may be reduced, to facilitate clearance of the metal chips or shavings. The handle and strike portion of the chisel is usually made in line with the shank portion, but it may have more or less angular relation thereto, to suit special circumstances of work required. Sometimes, for clearance purposes, the side wall of the guiding end 7 adjacent to the cutter may be beveled, as at 14, in Figs. 10, 11, 16, 17 and 18.

A right-hand tool is similar to a left-hand tool, except that its parts are in reverse, the oblique cutting edge being located on the right-hand side of the instrument. These chisels are designed to be made in different widths, the widths between the lateral walls of the portion 8 being designed to vary by thirty-seconds of an inch, this being sufficient for most purposes.

In using the tool, as for instance in widening the key-seat channel of one-half an inch to five-eighths of an inch, a right-hand chisel is driven through the channel, taking off a shaving of a thirty-second of an inch from the right-hand wall. This right-hand tool would therefore have the size of seventeen thirty-seconds. Then a left-hand tool of size eighteen thirty-seconds is worked through the channel, taking off a shaving of a thirty-second from its left-hand wall. By using two more chisels, one right-hand and one left-hand, of sizes nineteen thirty-seconds and twenty thirty-seconds respectively, the channel can be widened quickly and in workmanlike manner to five-eighths of an inch, its central line remaining in normal position. In this work the strong guide extension or bearing 7, preceding the cutting edge, serves to keep the latter to its work, and because of the parallelism of the guiding surfaces of this extension and of the guide portion 8 adjacent thereto, the cutting is effected in a true and accurate manner.

Sometimes it is preferred to make the cutting portion of this tool separate, in the form of a bit, as indicated at 16, the guide portion 8, to which the bit is adjusted, having a lateral notch 17, in which the bit is located and secured by attachment bolts 18. When the bit is made separate it should be provided with a bearing tenon 19 at its back, to fit a recess seat 20 in the lateral wall of the notch 17. And the heel end of the bit should be inclined or beveled, having an acute-angular bearing 20′ in the rear end wall of said notch, as in this way the working is not so hard on the bolts. A tenon 21, projecting from the heel of the bit, is designed to engage a middle seat 22 in the end wall of the notch.

A back spring 23 may be secured to the shank, said spring being serviceable when the tool is reversed in providing an elastic bearing, in finishing the work.

Fig. 1 of the drawings: This tool may be used first without the spring, and afterward secure the spring thereto and turn the tool upside down and drive through again, thus finishing the walls and cleaning out the metal left in the corners. The spring rests on the shafting at the bottom as the tool is being driven through, and the spring keeps the cutters in place, or to their work.

Fig. 3: A left-hand tool for tough metal, provided with a ⅝ inch guiding portion. The first cutting is done without the use of the spring. In the second operation use a right-hand tool of the same model and attach the spring, the spring being underneath.

Figs. 5, 6, 7 and 8: A left-hand tool, same as No. 12, but provided with a guiding or forward portion.

Fig. 9: The guiding end of this tool is ¾ inch gage. This tool is for the sides only, and the bottom cutter 15 merely to remove dirt and bunches of metal in the top of the old key-seat. This tool is for tough metal.

Fig. 10: To straighten a very crooked keyway, where there are bunches at the bottom and side walls. Drive through and the left side is made straight and also the bottom. Insert a right-hand tool with the spring attached, and drive through to straighten the left side wall. The taper is unchanged.

Fig. 12: This model is to widen a ¾ inch keyway to $\frac{13}{16}$, the cutting taking effect at the bottom of the left-hand wall. Then, to finish, use a similar tool, but right-hand, with spring attached, the spring being underneath, the tools being driven through one after the other, when $\frac{1}{16}$ inch would be removed from the left-hand wall and the same taper retained. This variety of edge shown in this tool is best adapted to brittle metal.

Fig. 13: A tool to be used in an old $\frac{9}{16}$ inch keyway or seat, which has been widened to $\frac{11}{16}$. This tool is used initially in removing metal left in the corners of a key-seat after the key seat has been widened. In use, the tool is driven in about one-inch, after which a second and similar tool, having a spring attached, is inserted and driven entirely through the channel, which removes entirely the metal left in the corners owing to the taper of the key. The cutter at the bottom or end is intended to remove any dirt or bunch of metal that may be in the bottom of the keyway. The side cutters are made on a slant to keep the tool from letting go its hold, or of the chip, the slant keeping the tool down (or up, as the case may be), or to its work. The forward extension 7 is straight and of the same width as the old keyway that is to be widened, so that it acts as a guide, and when the side cutters enter the key-seat and begin cutting, the chip is started and continued precisely of the proper dimensions.

Fig. 14: This tool also is used initially in removing the metal left in the corners of the key-seat owing to the taper thereof, after the key seat has been widened. The forward extension is a little more narrow than the space between the side cutters, causing a uniform shaving or chip upon both sides. The cutter at the bottom removes all dirt and bunches of metal.

Fig. 15: This model measures $\frac{9}{16}$ inch at the guiding or forward end, being the width of the old keyway. The side cutters are $\frac{1}{32}$ inch. If driven through a $\frac{9}{16}$ inch keyway the result would be a $\frac{5}{8}$ inch keyway. The cutting edge at the bottom removes the dirt and bunches of metal. Then attach the spring and turn the tool upside down and force the same tool through again, removing shavings from both sides. A notch is provided in this tool to receive the rear end of the spring, helping to keep the spring in place and the bolt from being cut off by forcing the tool through the keyway.

Fig. 16: This tool is made for tough metal, such as cold rolled steel, steel castings or bronze castings. It is the same in essentials as No. 3, shown in Fig. 18 with clearance for tough metal.

Fig. 18: This tool is used especially in cast-iron couplings, hubs of gears or pulleys. This tool, if forced into a keyway of $\frac{11}{16}$ inch dimensions, would remove $\frac{1}{32}$ inch from the left-hand wall.

Fig. 20: This tool would widen a $\frac{25}{32}$ inch keyway, at the bottom, $\frac{1}{32}$ inch on each side, to a height of $\frac{5}{16}$ inch. After which a tool is inserted wherein the cutters have a height of $\frac{5}{8}$ of an inch. Each tool must be forced entirely through the keyway before the second tool is inserted. After the second tool has been driven through, each side wall would be increased in width $\frac{1}{32}$ of an inch, to a height of $\frac{5}{8}$ of an inch. After this a tool is inserted of grade $\frac{27}{32}$ inch (being the width of the old keyway), provided with a pressure spring 29, and driven through, $\frac{1}{32}$ inch would be removed at each side, the walls straight, the corners perfect and the taper of the key-seat not changed. This relates to small work. In long keyways, I start with No. 5, shown in Fig. 20 and follow with Nos. 7 or 8, shown in Figs. 21 and 12 hereinafter referred to. The old keyway and the forward end of the chisel are always of the same size.

Fig. 21: This tool removes a shaving from the wall at right-hand side, to a height of $\frac{1}{4}$ inch. After this tool has been driven through, another of same width is inserted, with a cutter $\frac{1}{2}$ inch in height. Then insert a left-hand tool, the same width as the two other tools first referred to, turn this left-hand tool upside down (first attaching the spring thereto), and drive through, when the right-hand side wall will be finished and the corners trimmed out.

These tools may all be used first without the spring and afterward with the same, the spring being made of suitable size to fit the work. The cutters are made upon a slant, to keep the tool to its work and force the chips upwardly. Detachable jaws or cutter plates may be used in all cases. The cutters may be made of any size or thickness desired, and right or left, or upon both sides. All of these tools may be used in widening the key seat and afterward in removing the metal left in the corners.

What I claim is:

1. A chisel for widening key-seat channels, having a guide portion provided with parallel side walls and a forward guide extension of less width than that of said guide portion and having a beveled bottom face and a lateral face parallel with and adjacent to one side wall of said guide portion, said chisel having an oblique cutting edge in the plane of and terminating the other side wall of said guide portion.

2. A chisel for widening key-seat channels, having a guide portion provided with parallel side walls and a forward guide extension of less width than that of said guide portion, of the same width as the old key-seat and having a beveled bottom face and lateral faces one of which is parallel with and adjacent to one side wall of said guide portion, said chisel having an oblique cutting edge in the plane of and terminating the other side wall of said guide portion.

3. A chisel for widening key-seat channels, having a guide portion provided with parallel side walls and a forward parallel-wall guide extension of less width than that of said guide portion and having a beveled bottom face and a lateral face parallel with and adjacent to one side wall of said guide portion, said chisel having an oblique cutting edge in the plane of and terminating the other side wall of said guide portion, and a pressure spring secured to the chisel and located upon the side thereof opposite said beveled bottom face.

4. A chisel for widening key-seat channels, having a guide portion provided with parallel side walls and a forward parallel-wall guide extension of less width than that of said guide portion and having a beveled bottom face and a lateral face parallel with and adjacent to one side wall of said guide portion, said chisel having a lateral notch provided with a recess seat in its lateral wall and an acute-angle end wall having a middle seat, a detachable cutter fitting in said notch and provided with a tenon on its inner face engaging said recess seat, a beveled heel engaging said acute-angle end wall, and a tenon projecting from said heel and engaging said middle seat of the end wall, said cutter having an oblique cutting edge in the plane of the other side wall of said guide portion.

5. A chisel for widening key-seat channels, having a guide portion provided with parallel side walls, in rear thereof a tapering shank portion, and in front of said guide portion a guide extension of less width than that of said guide portion and having a beveled bottom face and lateral faces one of which is parallel with and adjacent to one side wall of said guide portion, said chisel having an oblique lateral cutting edge in the plane of the other side wall of said guide portion and a cutting edge at right-angles to that of said lateral cutting edge and at the termination of said beveled bottom face.

6. A chisel for widening key-seat channels, having a guide portion provided with parallel side walls, in rear thereof a tapering shank portion, and in front of said guide portion a guide extension of less width than that of said guide portion and of the same width as that of the old key-seat and having a beveled bottom face, a lateral face parallel with and adjacent to one side wall of said guide portion, an opposite beveled lateral face and a top face in continuation of the top face of said guide portion, said chisel having an oblique cutting edge in the plane of the other side wall of said guide portion.

7. A chisel for widening key-seat channels, having a guide portion provided with parallel side walls, in rear thereof a reduced clearance portion, and in front of said guide portion a guide extension having a beveled bottom face, a lateral surface parallel with and adjacent to one side wall of said guide portion, a beveled lateral surface, an obliquely-channeled portion at the base of said guide extension and an oblique cutting edge terminating said channeled portion and in the plane of the other side wall of said guide portion.

8. In a chisel for widening key-seats, a shank body having a lateral notch provided with a recess seat in its lateral wall and an acute-angle end wall having a middle seat, and a detachable cutter fitting in said notch and provided with a tenon on its inner lateral face engaging said recess seat, a beveled heel engaging said acute-angle end wall, and a tenon projecting from said heel and engaging said middle seat of the end wall, and attachment bolts connecting said cutter and said body.

In testimony whereof I affix my signature, in presence of two witnesses.

CHARLES F. PERKINS.

Witnesses:
MATTHEW LAUGHLIN,
JUNE E. LYNCH.